US012306735B2

(12) United States Patent
Baxter

(10) Patent No.: US 12,306,735 B2
(45) **Date of Patent: *May 20, 2025**

(54) ENHANCED CONFIGURATION MANAGEMENT OF DATA PROCESSING CLUSTERS

(71) Applicant: Hewlett Packard Enterprise Development LP, Spring, TX (US)

(72) Inventor: Joel Baxter, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/341,325

(22) Filed: Jun. 26, 2023

(65) Prior Publication Data

US 2023/0333953 A1 Oct. 19, 2023

Related U.S. Application Data

(63) Continuation of application No. 17/652,997, filed on Mar. 1, 2022, now Pat. No. 11,720,460, which is a continuation of application No. 16/376,057, filed on Apr. 5, 2019, now Pat. No. 11,281,551.

(51) Int. Cl.
*G06F 11/30* (2006.01)
*G06F 11/34* (2006.01)

(52) U.S. Cl.
CPC ...... *G06F 11/3006* (2013.01); *G06F 11/3404* (2013.01); *G06F 11/3428* (2013.01); *G06F 11/3433* (2013.01)

(58) Field of Classification Search
CPC ............... G06F 11/301; G06F 11/3006; G06F 11/3048; G06F 11/3404; G06F 11/3409; G06F 11/3428; G06F 11/3433
USPC .......................................................... 702/186
See application file for complete search history.

(56) References Cited

U.S. PATENT DOCUMENTS 8,615,676 B2 12/2013 Bender et al.
9,031,917 B2 5/2015 Pafumi et al.
9,384,114 B2 * 7/2016 Carmel ............... H04L 41/5025
9,515,869 B2 12/2016 Ngo
10,455,028 B2 10/2019 Baxter
11,281,551 B2 3/2022 Baxter
11,720,460 B2 * 8/2023 Baxter ................ G06F 11/3428 702/186
2011/0289084 A1 11/2011 Fisher
2013/0073716 A1 * 3/2013 DeJana ................. G06F 9/5077 709/224
2014/0136456 A1 5/2014 Susarla et al.
2014/0380332 A1 12/2014 Mathur et al.
2015/0254564 A1 * 9/2015 Rodriguez .............. G06N 5/04 706/52
2016/0294930 A1 10/2016 Rewaskar et al.

* cited by examiner

*Primary Examiner* — John H Le
(74) *Attorney, Agent, or Firm* — Slater Matsil, LLP

(57) ABSTRACT

Described herein are systems, methods, and software to enhance the management and deployment of data processing clusters in a computing environment. In one example, a management system may monitor data processing efficiency information for a cluster and determine when the efficiency meets efficiency criteria. When the efficiency criteria are met, the management system may identify a new configuration for the cluster and initiate an operation to implement the new configuration for the cluster.

20 Claims, 8 Drawing Sheets

200

201 MONITOR DATA PROCESSING EFFICIENCY INFORMATION FOR A CLUSTER

202 DETERMINE WHEN THE DATA PROCESSING EFFICIENCY INFORMATION MEETS AT LEAST ONE CRITIERION

203 IN RESPONSE TO THE MEETING THE CRITERIA, IDENTIFY AN OPTIMIZED CONFIGURATION FOR THE CLUSTER

204 INITIATE IMPLEMENTATION OF THE OPTIMIZED CONFIGURATION

ENHANCED CONFIGURATION MANAGEMENT OF DATA PROCESSING CLUSTERS

CROSS-REFERENCE TO RELATED APPLICATIONS

This application is a continuation application of and claims priority to application Ser. No. 17/652,997 filed on Mar. 1, 2022, which claims priority to application Ser. No. 16/376,057 filed on Apr. 5, 2019, the contents of which are hereby incorporated by reference in their entireties.

TECHNICAL BACKGROUND

An increasing number of data-intensive distributed applications are being developed to serve various needs, such as processing very large data sets that generally cannot be handled by a single computer. Instead, clusters of computers are employed to distribute various tasks, such as organizing and accessing the data and performing related operations with respect to the data. Various large-scale processing applications and frameworks have been developed to interact with such large data sets, including Hive, HBase, Hadoop, Spark, among others.

At the same time, virtualization techniques have gained popularity and are now commonplace in data centers and other computing environments in which it is useful to increase the efficiency with which computing resources are used. In a virtualized environment, one or more virtual nodes are instantiated on an underlying physical computer and share the resources of the underlying computer. Accordingly, rather than implementing a single node per host computing system, multiple nodes may be deployed on a host to more efficiently use the processing resources of the computing system. These virtual nodes may include full operating system virtual machines, containers, such as Linux containers or Docker containers, jails, or other similar types of virtual containment nodes. However, although virtualization techniques provide increased efficiency within computing environments, difficulties often arise in maintaining a desired data processing efficiency from the various virtual nodes. These difficulties can be compounded with changes to software configurations and hardware allocations to the virtual nodes.

SUMMARY

The technology described herein enhances the deployment and management of data processing clusters. In one implementation, a method of operating a management system of a computing environment includes monitoring data processing efficiency information for a cluster deployed with a first configuration in a computing environment and determining when the data processing efficiency information meets at least one criterion to transition the cluster from the first configuration to a second configuration. The method further includes, when the data processing efficiency information meets the at least one criterion, identifying an optimized configuration for the cluster and initiating implementation of the optimized configuration as the second configuration for the cluster.

DETAILED DESCRIPTION

Figure 1:
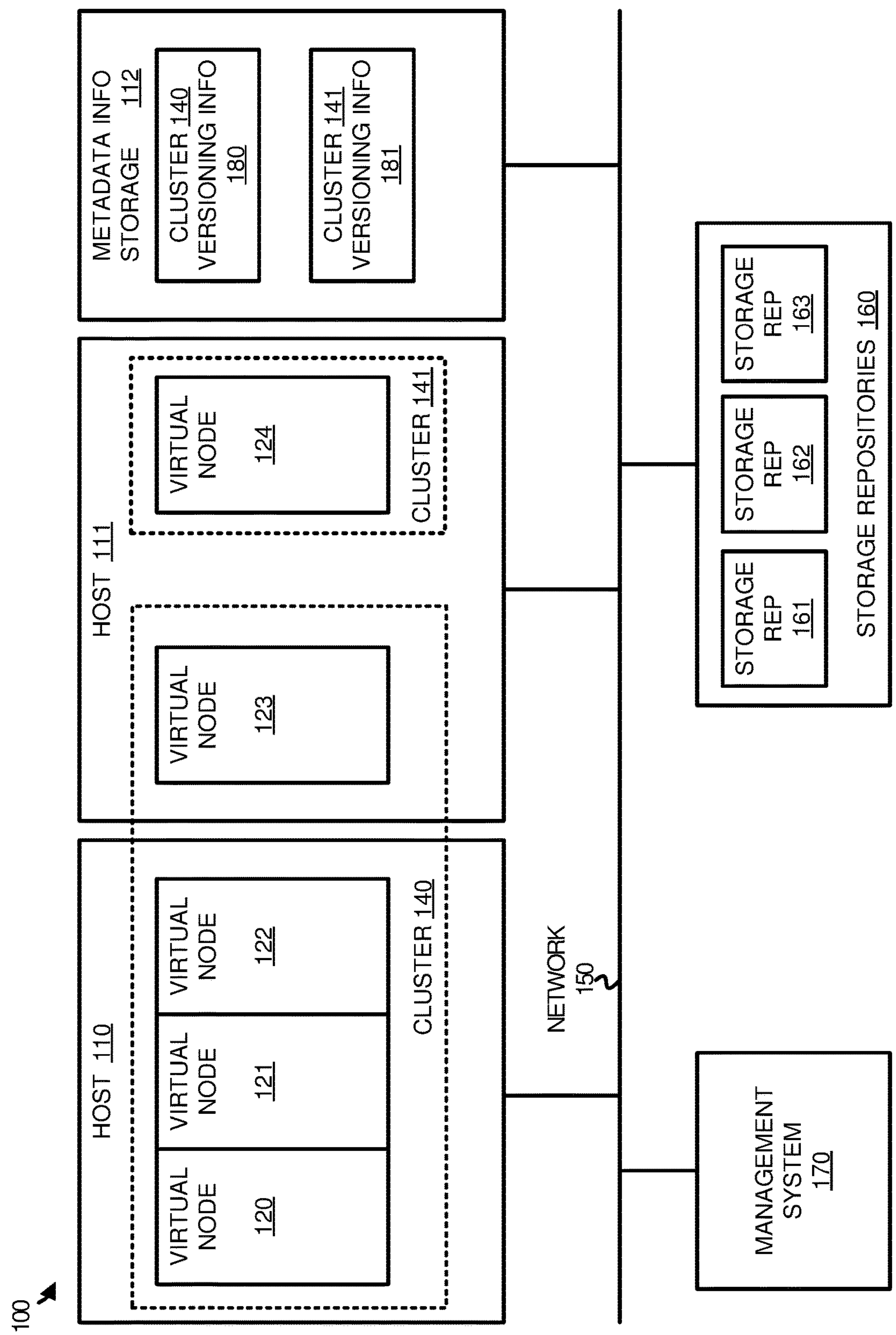
FIG. 1 illustrates a computing environment to manage versions of data processing clusters according to an implementation.

FIG. 1 illustrates a computing environment 100 to manage versions of data processing clusters according to an implementation. Computing environment 100 includes hosts 110-111, metadata information storage 112, management system 170, and storage repositories 160. Hosts 110-111, metadata information storage 112, management system 170, and storage repositories 160 communicate via network 150. Hosts 110-111 provide a platform for the execution of virtual nodes 120-124 as part of clusters 140-141, wherein virtual nodes 120-124 may comprise containers, virtual machines, or some other similar virtualized endpoint. Metadata information storage 112 includes versioning information 180-181 that each correspond to one of clusters 140-141. Storage repositories 160 includes storage repositories 161-163, wherein each storage repository in storage repositories 160 may correspond to a distributed file system, an object storage system, or some other data system capable of storing data for processing by clusters 120-124. Storage repositories may comprise one or more physical computing systems and may be stored on the same computing systems as hosts 110-111 in some examples.

In computing environment 100, clusters 140-141 are deployed to provide various data processing operations on storage repositories 160. These operations may comprise MapReduce operations, data search operations, or some other similar operations on data sets within storage repositories 160. For example, cluster 140 may be deployed as a MapReduce cluster to provide data processing operations on a distributed file system represented as storage repository 161. To provide enhanced efficiency in processing the data from the repository, cluster 140 is deployed as virtual nodes 120-123. Virtual nodes 120-123 of cluster 140 and virtual node 124 of cluster 141 may comprise containers in some examples, wherein the containers may comprise Linux containers, Docker containers, and other similar namespace-based containers. Rather than requiring a separate operating system, which is required for virtual machines, containers may share resources from the host computing system, wherein the resources may include kernel resources from the host operating system and may further include repositories and other approved resources that can be shared with other containers or processes executing on the host. However, although resources may be shared between the containers on a host, the containers are provisioned to have private access to the operating system with their own identifier space, file system structure, and network interfaces. The operating system may also be responsible for allocating processing resources, memory resources, network resources, and other similar resources to the containerized endpoint.

In some implementations, when a cluster is to be deployed within computing environment 100, a user or administrator associated with the cluster may provide configuration information for the cluster. This configuration information may include the quantity of nodes for the cluster, the processing resources that are allocated to nodes of the cluster (e.g. cores), the memory allocated to each node of the cluster, a type of data processing service provided by the virtual nodes (e.g. Hadoop, Spark, etc.), version of the processing service that will be executed on the cluster, the storage repositories that are required to be accessed by the cluster, or some other similar configuration information. Once the configuration is provided, the cluster is deployed with the corresponding configuration requirements. Using the example of cluster 140, an administrator may define the quantity of nodes to be executed for the cluster, processing and memory resources for the cluster, service type and versioning information for the cluster, or some other similar information. Once defined, management system 170 may be used to deploy virtual nodes 120-123 to support the requested cluster.

After a cluster is initially deployed in computing environment 100, management system 170 may maintain metadata information storage 112 that corresponds to configuration information for the various clusters in computing environment 100. This information may include the configuration information provided by the administrator, which may be updated as changes are made to a corresponding cluster. These configuration modifications may include changes to the quantity of virtual nodes, changes to the memory, storage, or processing resources allocated to each of the virtual nodes, changes to the service versions for data processing on the virtual nodes, or some other similar modification to the cluster.

In addition to maintaining the configurations state information for each of the clusters, management system 170 may further monitor and maintain data processing efficiency for each of the clusters in computing environment 100. In some implementations, the data processing efficiency for each of the clusters may correspond to the rate at which data is processed by the cluster. For example, management system 170 may, in combination with the nodes of a cluster, monitor the rate at which data is processed from a data repository when a request is generated for the cluster. In some implementations, the data processing efficiency for each of the clusters may correspond to the physical resources used by each of the clusters in relation to the data processing rate for the clusters. In determining the efficiency, management system 170 may consider the data processing rate for the cluster in relation to the quantity of physical hosts being used to support the cluster, the power requirements of the hosts to support the cluster, or some other similar physical resource requirement for the cluster.

As management system 170 monitors data processing efficiency information, management system 170 may determine that a modification should be implemented for a cluster in computing environment 100. For example, management system 170 determines that the data processing efficiency information for a cluster meets modification criteria and initiates an operation to modify the configuration of the cluster. In some implementations, management system 170 may initiate the processes to implement the required modification to the cluster, wherein the modification may revert the state of the cluster to a previous state, may modify the state of a cluster to the state of another cluster that is providing a better data processing efficiency, or may provide any other similar operation to update the configuration of the cluster. In other implementations, management system 170 may generate a notification for an administrator associated with the cluster to indicate an issue with the data processing efficiency of the cluster. Management system 170 may further provide suggestions of how the data processing efficiency may be improved based on previous states of the cluster, based on the configurations of one or more other clusters in computing environment 100, or based on any other similar data. Once provided, the administrator may elect to implement the suggested configuration modification and management system 170 may initiate the requested operation.

Figure 2:
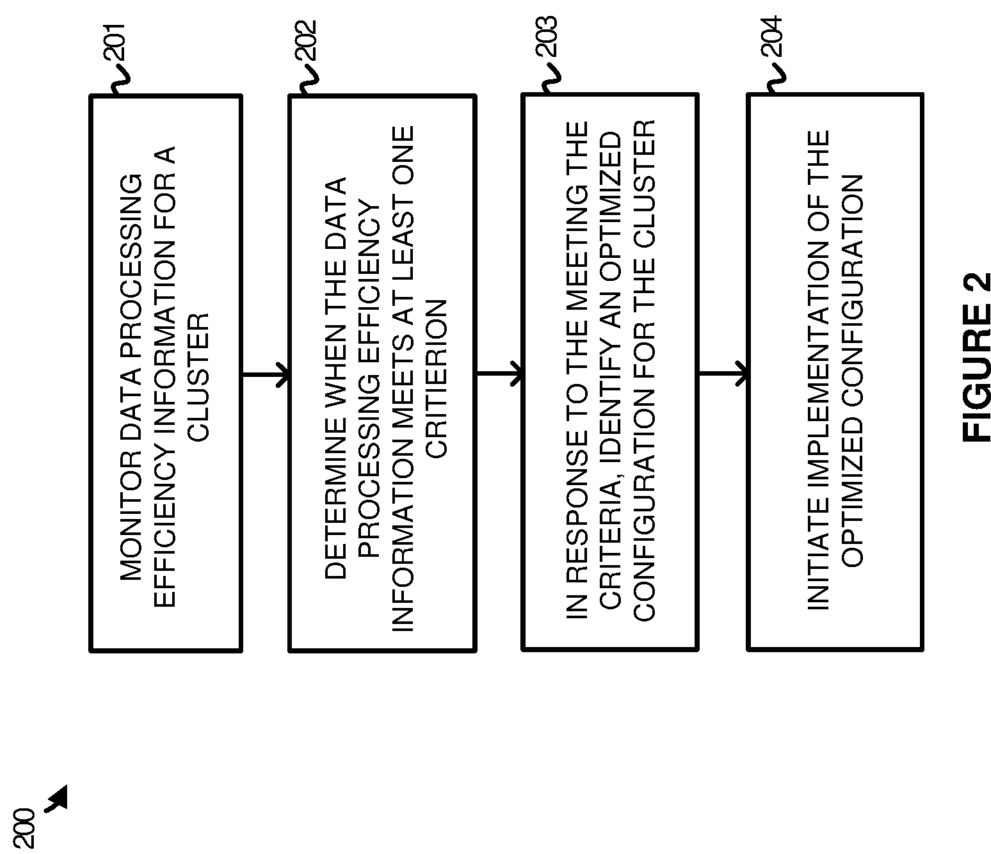
FIG. 2 illustrates an operation of a management system according to an implementation.

FIG. 2 illustrates an operation 200 of a management system according to an implementation. Operation 200 is described parenthetically in the paragraphs that follow with reference to systems and elements of computing environment 100 of FIG. 1.

In operation, management system 170 monitors (201) data processing efficiency information for a cluster. The data processing efficiency information may include the data processing rate for the cluster, or the quantity of data processed from a repository as a function of the response time for job processes, the physical resources allocated to the cluster, or some other similar efficiency factor, including combinations thereof. In at least one implementation, management system 170 may monitor the data processing efficiency as a function of the physical resources that are allocated to the cluster. The physical resources may include the quantity of hosts for a cluster, the quantity of processing, memory, or storage resources that are allocated to the cluster, or some other similar physical resource for the cluster.

While monitoring the data processing efficiency information, management system 170 determines (202) when the data processing efficiency information meets at least one criterion. In some implementations, the at least one criterion may correspond to a difference in data processing rate for the cluster between a first version and a second version. For example, referring to cluster 140, a first version of the cluster may provide a first data processing rate. However, when the configuration of cluster 140 is changed to a second version, the cluster may provide a second data processing rate. Information about the data processing rates for each of the cluster configurations may be maintained by management system 170 and stored as part of metadata information storage 112. As a result, when the first data processing rate and the second data processing rate differ by a defined threshold value, management system 140 may determine that the at least one criterion has been satisfied. Although comparing data processing rate between versions of a cluster may be used in determining whether the at least one criterion is satisfied, in other examples, management system 140 may determine when the data processing rate in conjunction with the physical resource utilization meets one or more criteria. For example, management system 170 may determine that the data processing rate for a cluster in relation to the quantity of physical resources allocated to the cluster fails to satisfy minimum efficiency criteria. Additionally, management system 170 may determine when the data processing efficiency information fails to meet an adequate processing rate for data in relation to other clusters that may be operating in computing environment 100 or on similarly configured computing environments.

Once the at least one criterion is satisfied, management system 170 identifies (203) an optimized configuration for the cluster and initiates (204) implementation of the optimized configuration. In some implementations, in determining the optimized configuration for the cluster, management system 170 may identify a previous version of the cluster that indicated improved data processing efficiency information and initiate operations to implement the previous version of the cluster. For example, cluster 140 may initially be deployed with a first version of a distributed data processing service, wherein the first version of the data processing service is associated with first data processing efficiency information. At a later time, cluster 140 may be updated to a second version of the distributed data processing service, wherein the second version of the data processing service is associated with second data processing efficiency information. After the update, management system 170 may determine that the data processing efficiency information for cluster 140 fails to meet efficiency criteria and may identify the first version as providing increased efficiency for the data processing operations of the cluster. Once identified, management system 170 may initiate an operation to implement the first version of the cluster with the first version of the distributed data processing service.

In some implementations, rather than identifying a previous version of the cluster for the modification, management system 170 may monitor one or more other clusters that are operating in the environment to determine an operation to increase efficiency in the processing for the cluster. These operations may include monitoring the number of hosts that other clusters are operating, monitoring the quantity of nodes in the other clusters, monitoring the quantity of processing resources, memory resources, and storage resources that are allocated to the other clusters, monitoring version information for the data processing service on the other clusters, or monitoring any other information or attribute related to the resources and configuration of the other clusters. In addition to monitoring the resources and configuration information for the other clusters, management system 170 may also monitor the rate at which data is processed by the other clusters. The processing rate may then be compared to the physical resources of the cluster to determine whether any of the other clusters provide improved efficiency in processing data compared to the current cluster. As an example, management system 170 may determine that cluster 140 fails to provide adequate data processing efficiency with respect to data from storage repositories 160. As a result, management system 170 may use information for other clusters of the same service type in metadata information storage 112 to determine any configuration modifications to cluster 140. For example, if cluster 140 were operating using a first version of a data processing service, while another cluster were operating a second version of a data processing service, management system 170 may initiate an operation to reconfigure cluster 140 with the second version of the data processing service so long as the second version provided increased efficiency.

In some examples, when a modification is identified for a cluster's configuration, the cluster may be modified via an automated operation. For example, if a reduction in virtual nodes may increase the efficiency of the cluster, management system 170 may initiate the operations required to reduce the number of virtual nodes in the cluster. These operations may include stopping or putting to sleep one or more of the virtual nodes in the cluster and reconfiguring networking and communication configurations for the remaining nodes to continue the desired operations of the cluster. In some implementations, rather than automatically implementing the required modification, management system 170 may provide one or more suggestions for the administrator of the cluster to make the changes to the cluster. These changes may be determined based on previous versions of the same cluster, configurations of other clusters using the same data processing service, or some other similar information. For example, if cluster 140 were determined to be executing inefficiently, management system 170 may identify characteristics from one or more previous versions of the clusters that are no longer present in the current cluster. These changes may include changes in the quantity of physical hosts to support the cluster, memory or processing allocation changes to the cluster, data processing service version changes, or some other similar modification to the cluster. In some examples, management system 170 may generate an interface that indicates a suggested modification and may further demonstrate a reasoning or justification for the modification. This justification may include information about the data processing rate differences between configurations, the amount of physical resources used for the configurations, or some other similar information about the differences between the configurations. Once the options are provided for the administrator, the administrator may select one or more of the suggestions and management system 170 may initiate implementation of the configuration modification. Thus, if a suggestion were generated that indicated a reduction in the quantity of virtual nodes would increase the efficiency of data processing for the cluster, the administrator may select an option to implement the suggestion and management system 170 may initiate the required operations to implement the modification.

Figure 3A:
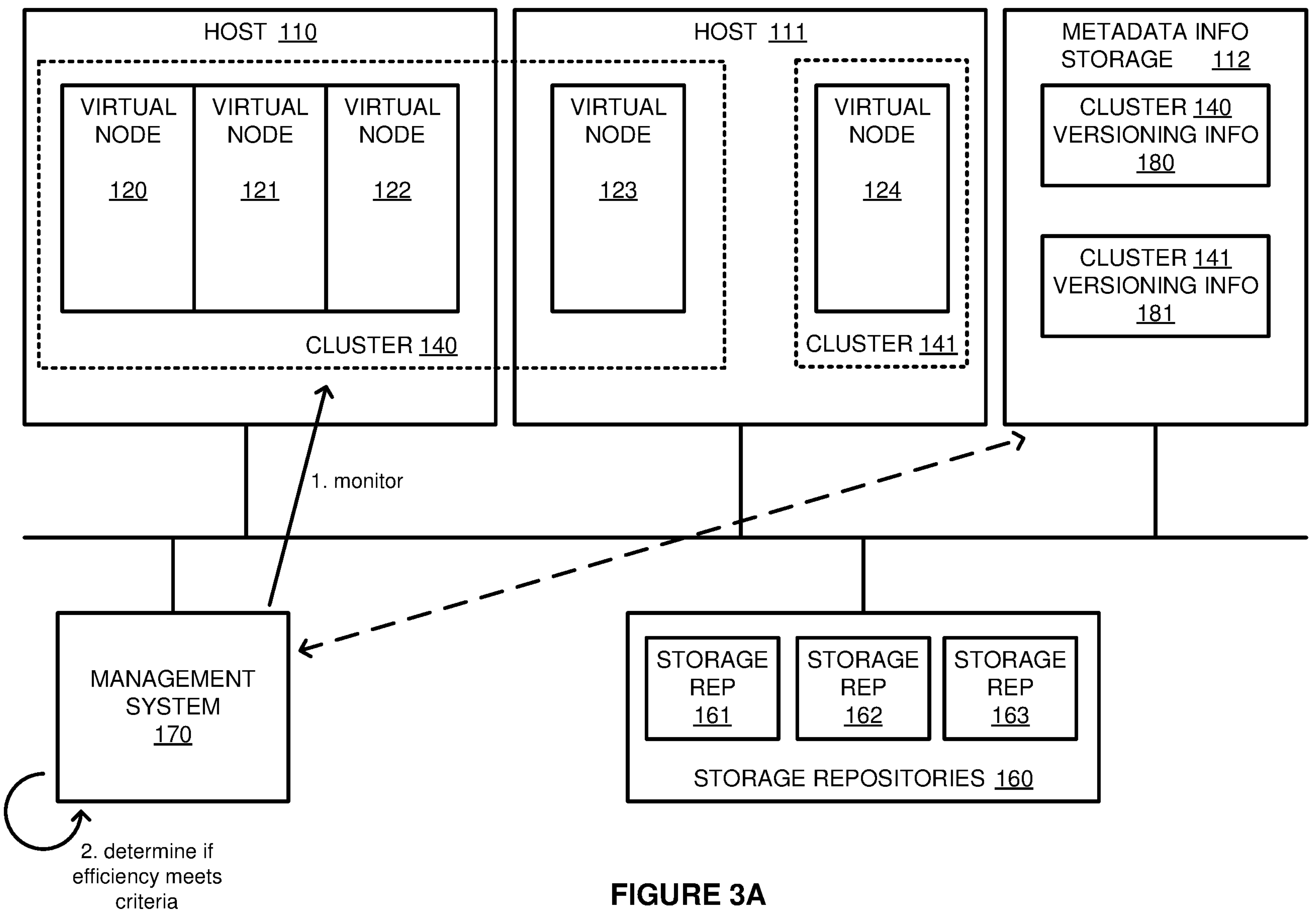
FIGS. 3A-3B illustrate an operational scenario to modify a configuration of a data processing cluster according to an implementation.
Figure 3B:
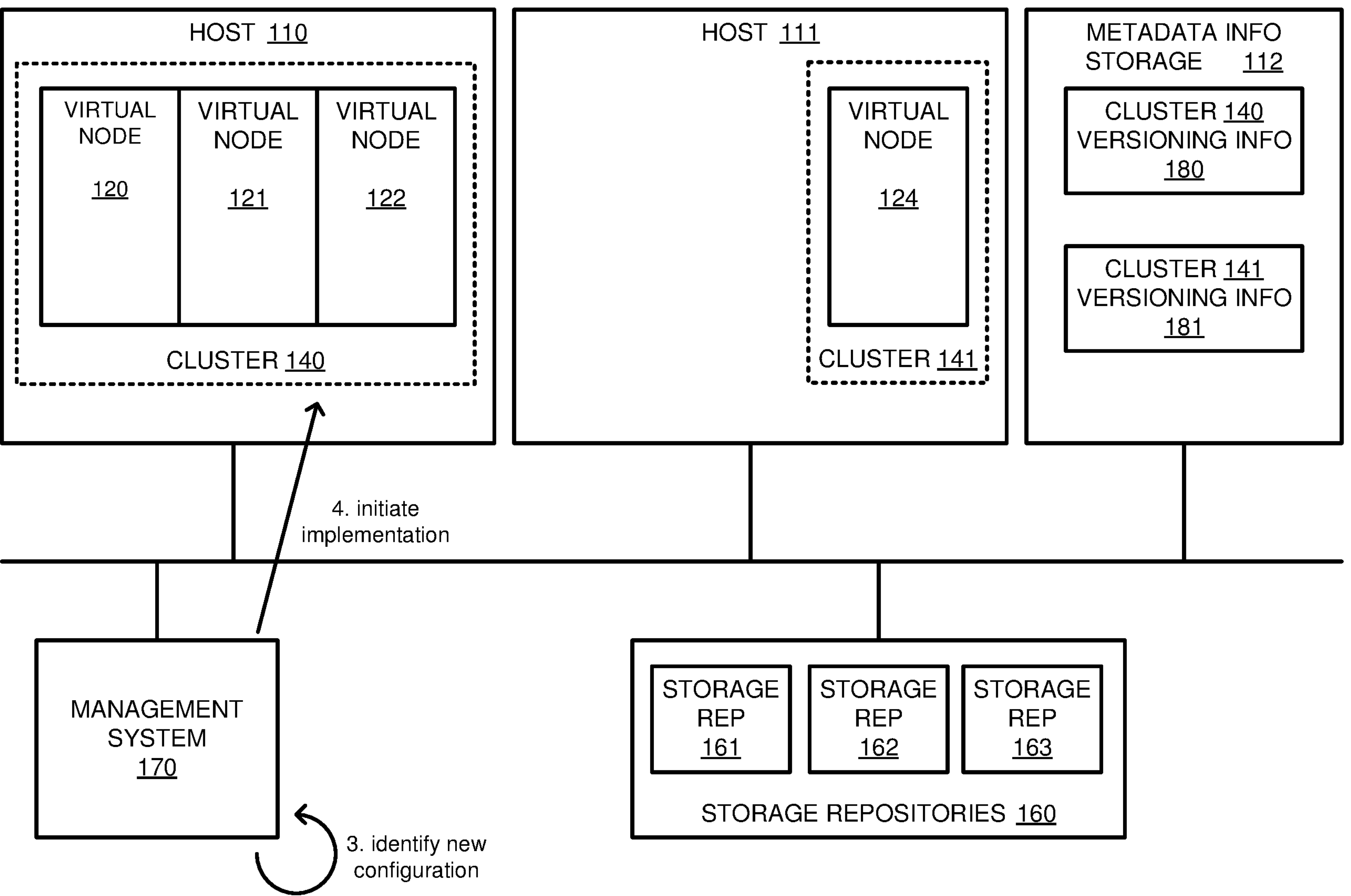

FIGS. 3A-3B illustrate an operational scenario to modify a configuration of a data processing cluster according to an implementation. FIGS. 3A and 3B include systems and elements of computing environment 100 of FIG. 1. In particular, FIG. 3A includes cluster 140 configured with virtual nodes 120-123, while FIG. 3B includes cluster 140 with virtual nodes 120-122.

Referring first to FIG. 3A, when a cluster is deployed in computing environment 100, management system 170 may maintain metadata information storage 112 that includes versioning information for each of the clusters in the environment (versioning information 180 and versioning information 181). The versioning information may include information about the configurations of the cluster, such as the quantity of virtual nodes for the cluster, the quantity of hosts for the cluster, the amount of resources provided to each node in the cluster, the data processing application used for the cluster, the version of the data processing application, or some other similar information. In addition to the configuration information, metadata information storage 112 may further include information about the data processing efficiency of the cluster. The data processing efficiency information may be determined based on a data processing rate (i.e., how much data is processed from a repository in storage repositories 160 over time), the data processing rate in relation to the physical resources that are provided to the cluster, or any other efficiency factor. The data processing efficiency information may be used in modifying the configuration of the cluster and determining when a configuration fails to meet minimum criteria. As an example, cluster 140 may have been deployed and modified twice to create three different versions of the cluster. A new version for the cluster may be identified when the data processing service is updated for the cluster from a first version to a second version, may be identified when resources are changed for the cluster, or may be identified at any other instance. When a new version is identified, information about the physical and software configuration may be added to the metadata information storage 112 and may be associated with data processing efficiency information for the cluster during the time with the configuration.

After a cluster is deployed, management system 170 may monitor, at step 1, the data processing efficiency information related to the cluster and determine, at step 2, when the data processing efficiency information fails to meet efficiency criteria. In at least one implementation, the current data processing efficiency information for the cluster in the current configuration may be compared to the data processing efficiency information of the cluster at other states for the cluster. For example, a score may be generated for each of the configuration states of the cluster, wherein score indicates the data processing efficiency for the cluster at the state. The score may be based on the data processing rate for the cluster in relation to the physical resources that are allocated to the virtual nodes of the cluster. As the scores are determined, management system 170 may determine when the difference between a current score for the cluster and a previous score for meets efficiency criteria. Thus, if cluster 140 were currently executing using a first configuration, but did not provide an adequate data processing efficiency in relation to a second configuration of the same cluster, management system 140 may determine that the cluster meets efficiency criteria.

Although demonstrated in the example above as comparing the data processing efficiency between versions or states of the same cluster, it should be understood that the data processing efficiency of a cluster may be compared to the efficiency of one or more other clusters that execute the same data processing service. For example, a first cluster operating with a first configuration may be compared against other clusters operating with second configurations that correspond to the same data processing service (e.g., Hadoop, Spark, etc.). When the first cluster fails to provide the same efficiency as the other clusters, management system 170 may determine that the data processing efficiency meets efficiency criteria.

Turning to FIG. 3B, once the criteria is met for a cluster, management system 170 may determine, at step 3, an optimized configuration or second configuration for the cluster. In some implementations, the second configuration for the cluster may be based on previous versions of the cluster, wherein the previous versions for the modification to the cluster may be identified based on the data processing efficiency of the cluster using the previous version or state of the cluster. The modifications of the cluster may include modifying physical resources allocated to each of the virtual nodes, modifying the quantity of hosts allocated to the cluster, modifying the quantity of nodes allocated to the cluster, modifying versions of the data processing service, or some other similar modification to the cluster. In at least one example, rather than configuring the cluster based on a single previous version of the cluster, the cluster may be modified based on multiple previous versions of the cluster. The modification may be based on correlations between data processing efficiency and traits of the previous clusters, including the physical resources allocated to the cluster, the data processing service version for the cluster, or any other correlation identified between the configuration and the data processing efficiency.

In other implementations, management system 170 may consult metadata information storage 112 to identify other clusters with a similar data processing service configuration to that of the cluster 140. These other clusters may operate using the same version of the data processing service (e.g., Hadoop, Spark, etc.), may operate using a different version of the data processing service, or may share other similar software traits with cluster 140. Once identified, management system 170 may determine whether any of the cluster configuration may provide improved data processing efficiency for cluster 140 and may further determine any configuration attributes that might have led to the increased data processing efficiency. For example, if cluster 140 and a second cluster included the same quantity of nodes, but different versions of the data processing service, then management system 170 may identify that the source of the different data processing efficiencies came as a result of the data processing service version. Management system 170 may then identify an updated version for the data processing service to be implemented in the virtual nodes of cluster 140

Here, management system 170 identifies that the data processing efficiency for cluster 140 may be improved by reducing the number of virtual nodes in the cluster. As a result, management system 170 initiates, at step 4, an operation to remove virtual node 123 from cluster 140. The operations to remove the node may include stopping or removing virtual node 123 from host 111, modifying any communication configurations of the cluster in association with the removal of virtual node 123, and any of virtual nodes 120-122 to provide the required operations associated with the removal of virtual node 123. Once updated, management system 170 may monitor the data processing efficiency of cluster 140 to determine whether the modification improved the data processing operations from storage repositories 160.

Figure 4A:
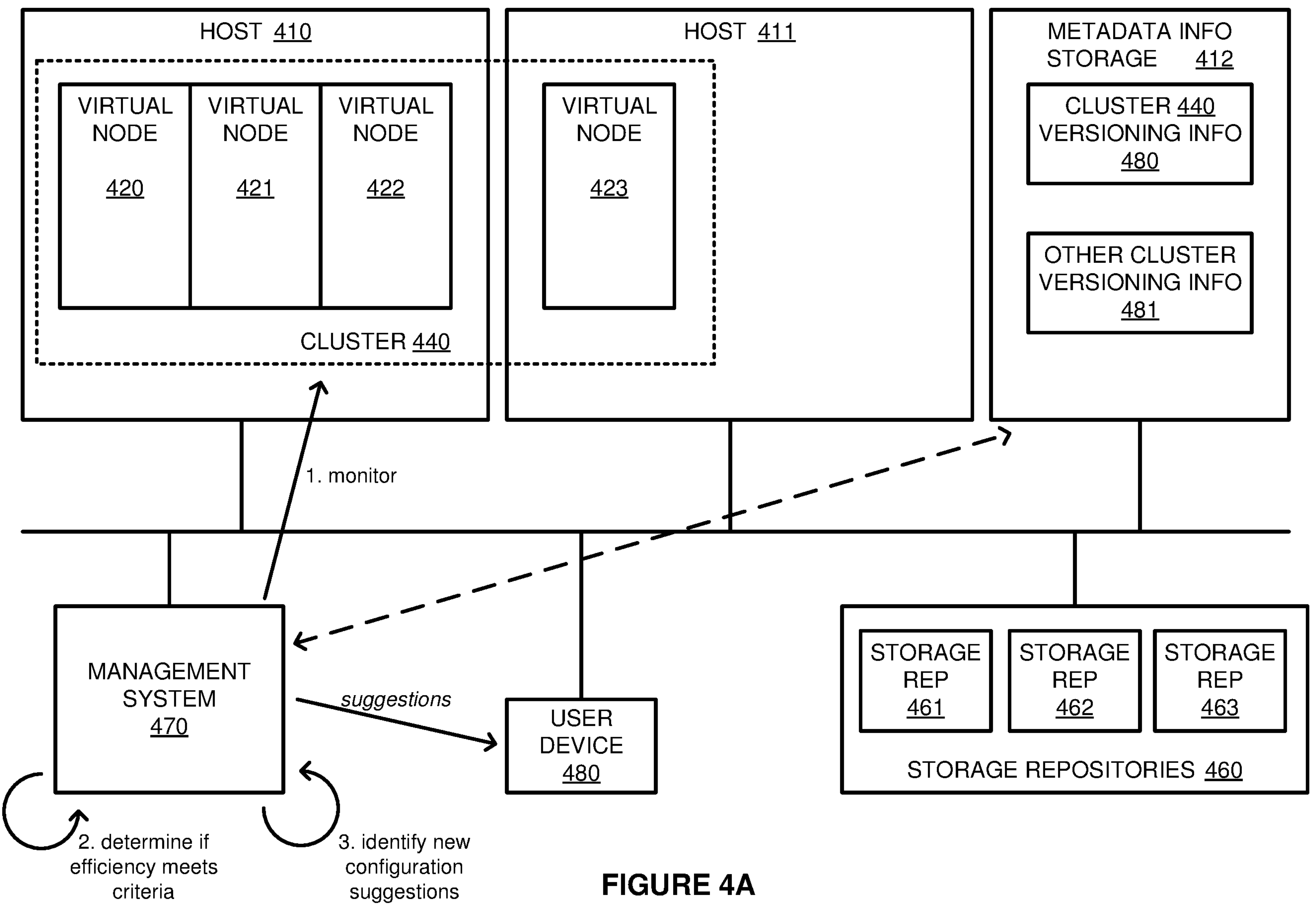
FIGS. 4A-4B illustrate an operational scenario to modify a configuration of a data processing cluster according to an implementation.
Figure 4B:
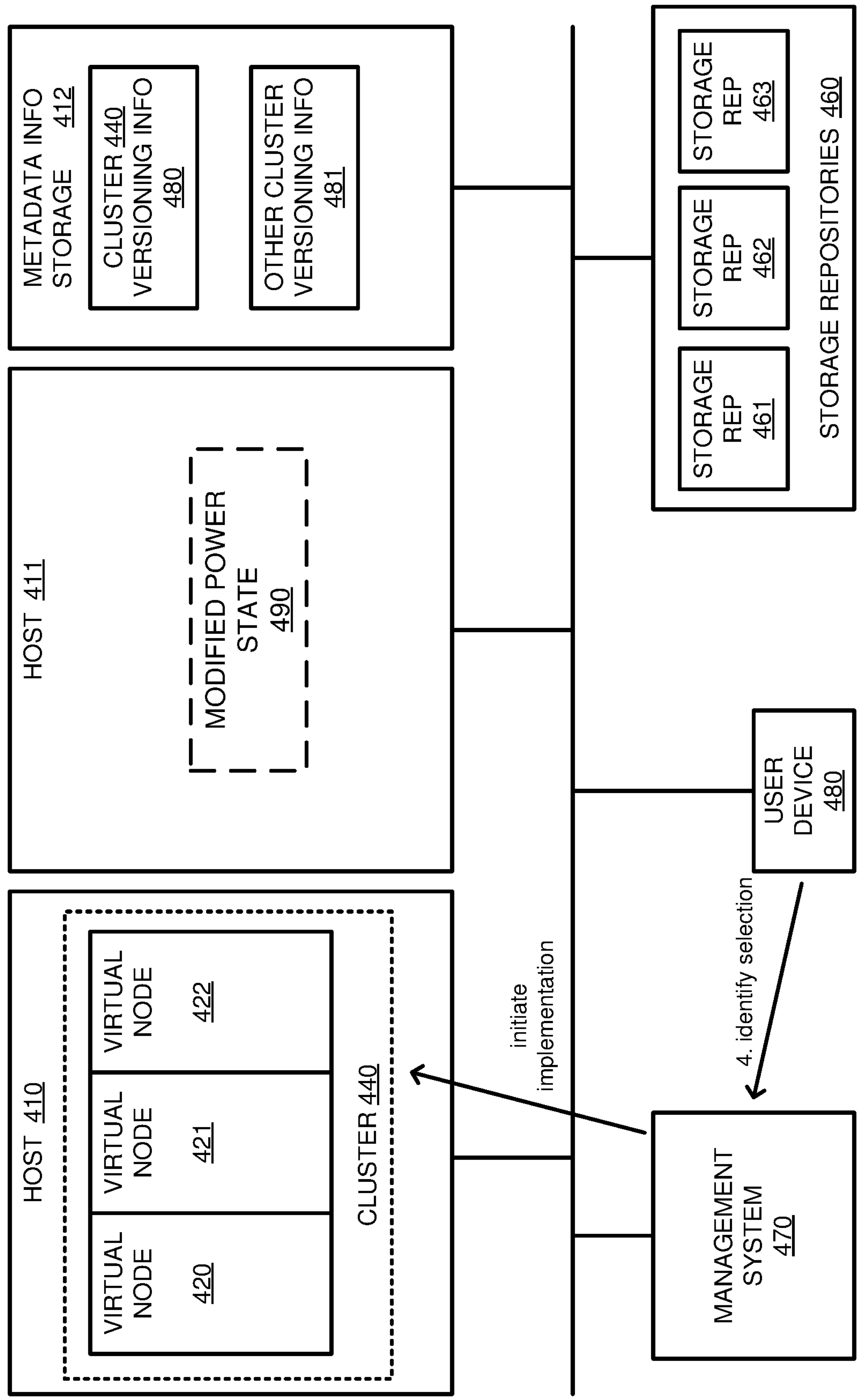

FIGS. 4A-4B illustrate an operational scenario to modify a configuration of a data processing cluster according to an implementation. FIGS. 4A-4B include hosts 410-411, metadata information storage 412, management system 470, user device 480, and storage repositories 460. Hosts 410-411 are used to provide a platform for virtual nodes 420-423 of cluster 440, wherein virtual nodes 420-423 execute a data processing service or framework capable of processing data from one or more storage repositories 461-463 in storage repositories 460. The data processing service may comprise a distributed data processing service that executes using multiple nodes to provide efficient processing operations across larger data sets.

Referring to FIG. 4A, management system 470 may monitor, at step 1, data processing efficiency information related to cluster 440 in the computing environment. The data processing efficiency information may be based on the amount of data processed by the cluster over a time period, may be based on the amount of physical resources allocated to the cluster, or may be based on any other efficiency factor for the cluster. As the data processing efficiency information is monitored, management system 470 may determine, at step 2, when the information meets one or more criterion indicative that cluster 440 is not operating as desired. In some implementations, the one or more criterion may correspond to a score or relationship defined by the rate at which data is processed by a cluster in relation to the amount of resources allocated to the cluster. The current score for the cluster may be compared to that of previous versions of the cluster, may be compared against suggested or defined scores for the cluster, may be compared against the scores of other clusters, or may be compared in any other similar manner. Although the one or more criteria comprising a score may be based on the relationship between processing rate and resource allocation, the criteria may also comprise data processing rates, query completion time requirements, or some other similar information related to the data processing efficiency of the cluster.

After determining that cluster 440 meets one or more efficiency criteria, management system 470 further identifies, at step 3, new configuration suggestions for cluster 440 and presents the suggestions at user device 480. In some implementations, in determining the new configuration suggestions, management system 470 may identify one or more previous configurations for cluster 440 with processing efficiency better than that of the current version or may identify one or more configurations of other clusters that provide increased efficiency in relation to cluster 440. Once the cluster versions with improved efficiency are identified, management system 470 may identify one or more attributes from the cluster versions to improve the current cluster. The attributes may include the version of the data processing service, physical resource allocations to the virtual nodes, the quantity of virtual nodes, or some other similar attribute. For example, cluster 440 may execute using four virtual nodes 420-423 that provide a first efficiency score, while a second cluster may execute using three virtual nodes that provide a second efficiency score that is better than the first efficiency score. As a result, management system 470 may identify traits of the second cluster, such as the use of three virtual nodes instead of four virtual nodes, to provide suggestions to the administrator associated with cluster 440.

In some implementations, in monitoring the data processing efficiency information for clusters in the computing environment, management system 470 may maintain metadata information storage 412. Metadata information storage 412 may include cluster versioning information 480-481 for cluster 440 as well as other clusters that are operating in the computing environment. The versioning information may include configuration attributes for different versions of the clusters, the data processing efficiency for the clusters in each of the versions, or some other similar information about the various versions of the clusters in the computing environment.

Turning to FIG. 4B, once the suggestions are provided to user device 480, the user may select, at step 4, one or more of the suggestions for implementation in the computing environment. Here, the selection from user device 480 indicates a request to remove a virtual node from cluster 440. In response to the request, management system 470 may identify a corresponding node in the cluster for removal and initiate operations to remove the corresponding node. Here, to limit the physical resources required for cluster 440, virtual node 423 is removed from the cluster, such that host 411 no longer executes any virtual nodes for the cluster. In removing virtual node 423, management system 470 may update the configurations of the individual virtual nodes as well as any networking operations such that the cluster is limited to communications for the remaining virtual nodes 420-422. Once removed, management system 470 may further modify the power state of host 411 to modified power state 490, wherein the modification may include turning off host 411, placing host 411 into a sleep state, or providing some other modification to the state of host 411.

Figure 5:
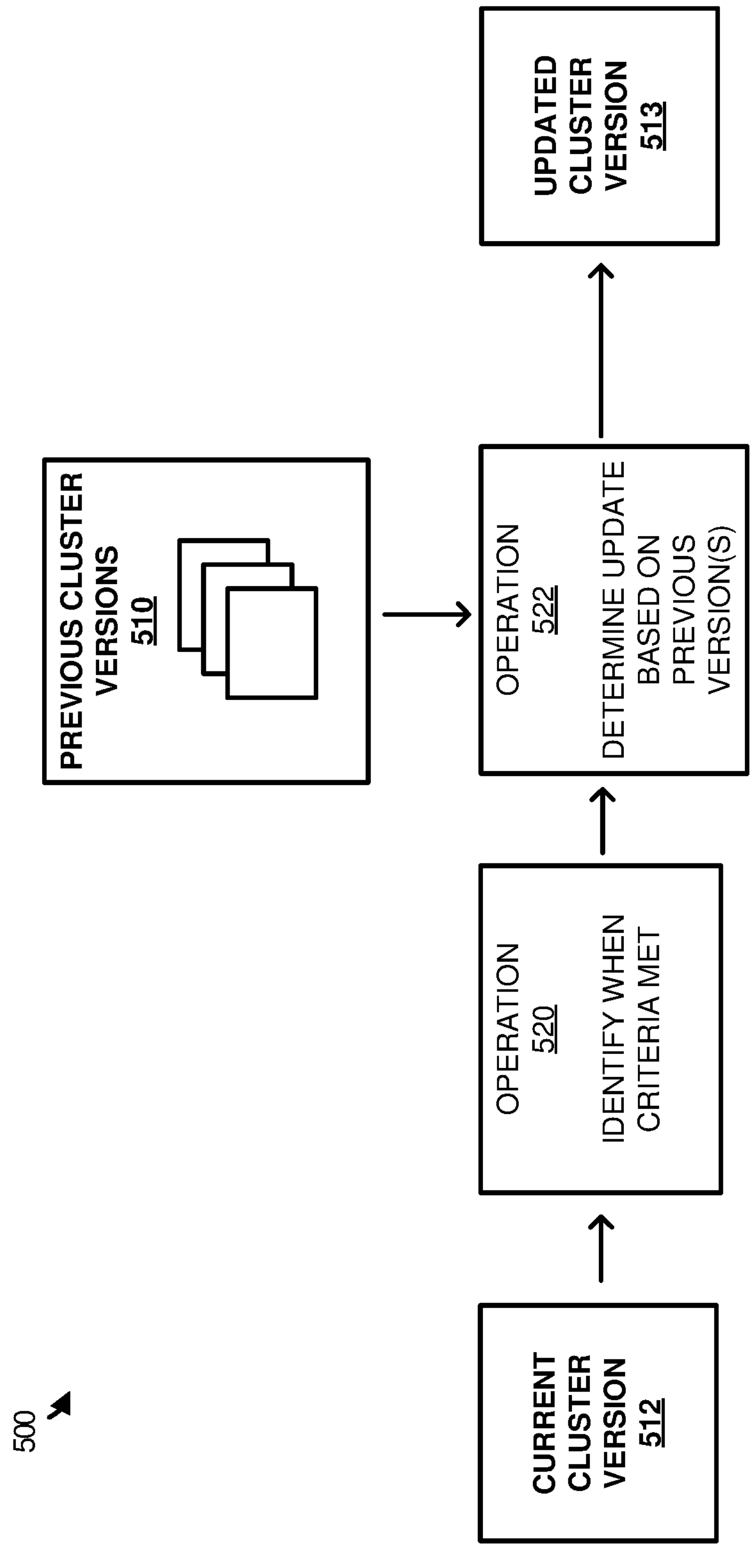
FIG. 5 illustrates a flow diagram for updating a data processing cluster configuration according to an implementation.

FIG. 5 illustrates a flow diagram 500 for updating a data processing cluster configuration according to an implementation. Flow diagram 500 includes current cluster version 512, previous cluster version 510, and updated cluster version 513. Flow diagram 500 further includes operations 520 and 522 that are implemented by a management system for a computing environment, such as management system 170 of FIG. 1.

In operation, a management system provides operation 520 for a cluster to identify when data processing efficiency for current cluster version 512 meets one or more efficiency criteria. This data processing efficiency for the cluster may be determined based on the data processing rate for the cluster, the resources that are allocated to the cluster, or some other efficiency factor, including combinations and relationships thereof. When the one or more criteria are met for current cluster version 512, the flow diagram proceeds to operation 522, wherein operation 522 is used to determine an update to the cluster based on previous cluster versions 510. In particular, operation 522 may identify one or more previous versions for the cluster related to an increased data processing efficiency and identify configuration attributes for the cluster versions that may correspond to the increased data processing efficiency. For example, a first version of a data processing service may correspond to multiple cluster versions with the highest data processing efficiency. As a result, operation 522 may correlate the first version of the data processing service with a higher data processing efficiency.

Once the configuration attributes are identified that may correspond to the increased efficiency, updated cluster version 513 may be generated using the attributes. In some examples, the attributes may be implemented automatically without feedback from a user associated with the cluster. In other examples, the attributes may be provided as suggestions to a user, wherein the user may select one or more of the suggested attributes to implement in the cluster. These attribute changes may include the quantity of virtual nodes in the cluster, the physical resources allocated to each of the virtual nodes, or some other similar configuration attribute of the cluster.

Figure 6:
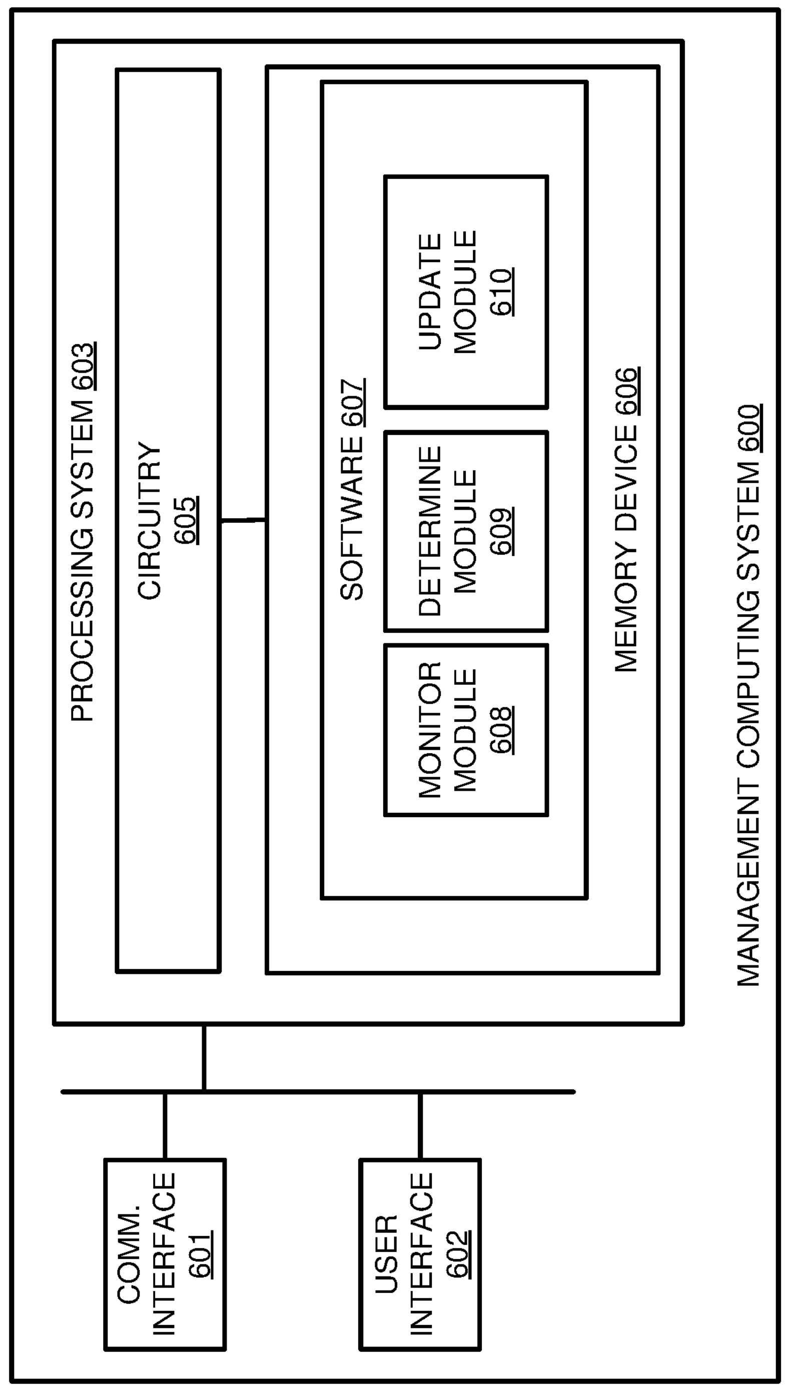
FIG. 6 illustrates a management computing system according to an implementation.

FIG. 6 illustrates a management computing system 600 according to an implementation. Computing system 600 is representative of any computing system or systems with which the various operational architectures, processes, scenarios, and sequences disclosed herein for a management system may be implemented. Computing system 600 is an example of management systems 170 and 470, although other examples may exist. Computing system 600 comprises communication interface 601, user interface 602, and processing system 603. Processing system 603 is linked to communication interface 601 and user interface 602. Processing system 603 includes processing circuitry 605 and memory device 606 that stores operating software 607. Computing system 600 may include other well-known components such as a battery and enclosure that are not shown for clarity.

Communication interface 601 comprises components that communicate over communication links, such as network cards, ports, radio frequency (RF), processing circuitry and software, or some other communication devices. Communication interface 601 may be configured to communicate over metallic, wireless, or optical links. Communication interface 601 may be configured to use Time Division Multiplex (TDM), Internet Protocol (IP), Ethernet, optical networking, wireless protocols, communication signaling, or some other communication format-including combinations thereof. In at least one implementation, communication interface 601 may be used to communicate with one or more hosts of a computing environment, wherein the hosts execute virtual nodes to provide various data processing operations. Communication interface 601 may further communicate with a metadata storage system capable of storing metadata and configuration information for the clusters deployed in a computing environment.

User interface 602 comprises components that interact with a user to receive user inputs and to present media and/or information. User interface 602 may include a speaker, microphone, buttons, lights, display screen, touch screen, touch pad, scroll wheel, communication port, or some other user input/output apparatus-including combinations thereof. User interface 602 may be omitted in some examples.

Processing circuitry 605 comprises microprocessor and other circuitry that retrieves and executes operating software 607 from memory device 606. Memory device 606 may include volatile and nonvolatile, removable and non-removable media implemented in any method or technology for storage of information, such as computer readable instructions, data structures, program modules, or other data. Memory device 606 may be implemented as a single storage device, but may also be implemented across multiple storage devices or sub-systems. Memory device 606 may comprise additional elements, such as a controller to read operating software 607. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing circuitry 605 is typically mounted on a circuit board that may also hold memory device 606 and portions of communication interface 601 and user interface 602. Operating software 607 comprises computer programs, firmware, or some other form of machine-readable program instructions. Operating software 607 includes monitor module 608, determine module 609, and update module 610, although any number of software modules may provide a similar operation. Operating software 607 may further include an operating system, utilities, drivers, network interfaces, applications, or some other type of software. When executed by processing circuitry 605, operating software 607 directs processing system 603 to operate computing system 600 as described herein.

In one implementation, monitor module 608 directs processing system 603 to monitor data processing efficiency information for a cluster deployed in a computing environment, wherein the cluster comprises virtual nodes that provide a distributed data processing service. While monitoring the cluster, determine module 609 may determine when the data processing efficiency information meets efficiency criteria associated with modifying a configuration for the cluster from a first configuration to a second configuration. In some implementations, computing system 600 may determine a current data processing efficiency for the cluster based on the data processing rate for the cluster, the quantity of resources allocated to the cluster, the query response rate of the cluster, or some other similar efficiency rate factor, including combinations thereof. In at least one example, determine module 609 may determine when the data processing rate for the cluster fails to meet processing rate criteria. In other implementations, determine module 609 may determine an efficiency score (value, grade, or other similar score) based on one or more of the aforementioned efficiency rate factors and may determine whether the score satisfies criteria. The criteria may be defined by an administrator associated with the cluster, may be defined based on previous versions of the same cluster, may be defined based on other clusters in the computing environment, or may be defined in any other manner.

When the cluster meets the efficiency criteria, update module 610 determines updates to the cluster to improve the data processing efficiency and initiates operations to implement the updates. The updates may correspond to changes in the physical resources allocated to the virtual nodes of the cluster, changes to the quantity of virtual nodes, changes to the version of the data processing service executed by the virtual nodes, or some other similar update. In some implementations, the update may be identified by determining configuration attributes that correspond to increased efficiency for previous versions of the same cluster. For example, previous versions of the cluster may have employed a different version of the distributed data processing service. As a result, if a particular previous version correlates to an increased data processing efficiency, the previous version may be identified for implementation in the current cluster. Further, in addition to or in place of, determining updates from previous versions of the same cluster, update module 610 may determine updates based on the configuration attributes of other clusters in the environment that execute the same data processing service. Accordingly, if another cluster were providing an improved data processing efficiency than the current cluster, attributes of the other cluster may be identified that correlate to the increased efficiency and can be used in updating the current cluster.

In some examples, in initiating the operation to update the cluster, update module 610 may automatically initiate the operations to update the cluster. These operations may include software updates, removal or stopping of virtual nodes, the addition of virtual nodes, updates to software settings and network configurations, or some other similar operation with respect to the cluster. In other implementations, when an update is identified for the cluster, update module 610 may provide suggestions of the one or more configuration attributes to an administrator associated with the cluster. These suggestions may be provided as an alert on management computing system 600 or may be provided as an alert via an application at a client user device associated with the administrator. Once provided, the administrator may select one or more of the suggested attributes for implementation, and update module 610 may update the corresponding attributes of the cluster. For example, update module 610 may generate an alert that indicates multiple options for updating a cluster, wherein the update comprises an interface that permits an administrator to select one or more of the options for the cluster. In response to the selection, update module 610 may update the cluster in accordance with the user selections. This update operation may include software updates, removal or stopping of virtual nodes, the addition of virtual nodes, updates to software settings and network configurations, or some other similar operation with respect to the cluster.

In some implementations, as monitor module 608 monitors the data processing efficiency information for the clusters of the computing environment, monitor module 608 may maintain a metadata information storage system capable of maintaining various information about the configurations of clusters in the computing environment. In at least one example, the maintained information may include configuration attributes for the clusters at different states, wherein the configuration information may be identified periodically for the clusters, may be identified when a modification is made to the clusters, or may be identified at any other similar interval. Additionally, for each state of the clusters, monitor module 608 may associate data processing efficiency information for the cluster at that state. This efficiency information may be used to identify attributes to be used in updating clusters to improve data processing efficiency in the clusters.

Returning to the elements of FIG. 1, hosts 110-111, metadata information storage 112, and management system 170 may each comprise communication interfaces, network interfaces, processing systems, computer systems, microprocessors, storage systems, storage media, or some other processing devices or software systems, and can be distributed among multiple devices. Examples of hosts 110-111, metadata information storage 112, and management system 170 can include software such as an operating system, logs, databases, utilities, drivers, networking software, and other software stored on a computer-readable medium. Hosts 110-111, metadata information storage 112, and management system 170 may comprise, in some examples, one or more server computing systems, desktop computing systems, laptop computing systems, or any other computing system, including combinations thereof. In some implementations, hosts 110-111 may comprise virtual machines that comprise abstracted physical computing elements and an operating system capable of providing a platform for the virtual nodes. Hosts 110-112 may operate on the same physical computing system or may execute across multiple computing systems in these examples.

Storage repositories 160 may reside on any computing system or systems that can include communication interfaces, network interfaces, processing systems, computer systems, microprocessors, storage systems, storage media, or some other processing devices or software systems, and can be distributed among multiple devices. Storage repositories 160 may be located on one or more server computing systems, desktop computing systems, laptop computing systems, or any other computing system, including combinations thereof.

Communication between hosts 110-111, metadata information storage 112, storage repositories 160, and management system 170 may use metal, glass, optical, air, space, or some other material as the transport media. Communication between hosts 110-111, metadata information storage 112, storage repositories 160, and management system 170 may use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication between hosts 110-111, metadata information storage 112, storage repositories 160, and management system 170 may be a direct link or can include intermediate networks, systems, or devices, and can include a logical network link transported over multiple physical links. In some implementations, hosts 110-111 may communicate with storage repositories 160 using ethernet, however, it should be understood that the communication may comprise PCIe, fibre channel, or some other similar communication protocol.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:

monitoring, by a computing system, data processing efficiency information for a cluster deployed with a first configuration in a computing environment;

determining, by the computing system, when the data processing efficiency information meets at least one criterion to transition the cluster from the first configuration to a second configuration by determining that a first data processing efficiency score associated with the first configuration fails to satisfy a threshold efficiency value;

when the data processing efficiency information meets the at least one criterion, identifying, by the computing system, one or more suggested configuration modifications for the cluster;

generating, for display, a notification to indicate the one or more suggested configuration modifications;

identifying a selection of at least one modification for the cluster from the one or more suggested configuration modifications; and initiating, by the computing system, implementation of the at least one modification to transition the cluster from the first configuration to the second configuration.

2. The method of claim 1, wherein the data processing efficiency information comprises a data processing rate from a storage repository.

3. The method of claim 2, wherein the storage repository comprises a distributed file system or object storage system.

4. The method of claim 2, wherein the data processing efficiency information comprises physical resource allocation information for the cluster.

5. The method of claim 1, wherein the data processing efficiency information comprises a score indicative of a relationship between a data processing rate of the cluster to a physical resource allocation to the cluster.

6. The method of claim 1, wherein the second configuration comprises one or more different configuration attributes than the first configuration, wherein the one or more different configuration attributes comprise processing resources for virtual or physical nodes of the cluster, memory resources for virtual nodes of the cluster, a data processing service version for the cluster, or a quantity of virtual nodes in the cluster.

7. The method of claim 1, wherein identifying the one or more suggested configuration modifications for the cluster comprises:

identifying a data processing service associated with the cluster;

identifying one or more other clusters executing the data processing service;

determining data processing efficiency information associated with the one or more other clusters; and identifying the one or more suggested configuration modifications for the cluster based on the data processing efficiency information associated with the one or more other clusters and configuration differences between the cluster and the one or more other clusters.

8. The method of claim 1, wherein the cluster comprises a plurality of containers.

9. The method of claim 1, wherein identifying the one or more suggested configuration modifications for the cluster comprises:

identifying data processing efficiency information associated with one or more previous configurations of the cluster; and identifying the one or more suggested configuration modifications for the cluster based on the data processing efficiency information associated with the one or more previous configurations of the cluster and configuration differences between the first configuration of the cluster and the one or more previous configurations of the cluster.

10. An apparatus comprising:
- one or more non-transitory computer readable storage media;
- a processing system operatively coupled to the one or more non-transitory computer readable storage media; and
- program instructions stored on the one or more non-transitory computer readable storage media that, when executed by the processing system, direct the processing system to:
  - monitor data processing efficiency information for a cluster deployed with a first configuration in a computing environment, wherein the cluster comprises a plurality of containers;
  - determine when the data processing efficiency information meets at least one criterion to transition the cluster from the first configuration to a second configuration by determining that a first data processing efficiency score associated with the first configuration fails to satisfy a threshold efficiency value;
  - when the data processing efficiency information meets the at least one criterion, identify one or more suggested configuration modifications for the cluster;
  - generate, for display, a notification to indicate the one or more suggested configuration modifications;
  - identify a selection of at least one modification for the cluster from the one or more suggested configuration modifications; and
  - initiate implementation of the at least one modification to transition the cluster from the first configuration to the second configuration.

11. The apparatus of claim 10, wherein the data processing efficiency information comprises a data processing rate from a storage repository.

12. The apparatus of claim 11, wherein the data processing efficiency information comprises physical resource allocation information for the cluster.

13. The apparatus of claim 10, wherein the data processing efficiency information comprises a score indicative of a relationship between a data processing rate of the cluster to a physical resource allocation to the cluster.

14. The apparatus of claim 10, wherein the program instructions that direct the processing system to identify the one or more suggested configuration modifications for the cluster include instructions that direct the processing system to:
- identify a data processing service associated with the cluster;
- identify one or more other clusters executing the data processing service;
- determine data processing efficiency information associated with the one or more other clusters; and
- identify the one or more suggested configuration modifications for the cluster based on the data processing efficiency information associated with the one or more other clusters and configuration differences between the cluster and the one or more other clusters.

15. The apparatus of claim 10, wherein the program instructions that direct the processing system to identify the one or more suggested configuration modifications for the cluster include instructions that direct the processing system to:
- identify data processing efficiency information associated with one or more previous configurations of the cluster; and
- identify the one or more suggested configuration modifications based on the data processing efficiency information associated with the one or more previous configurations of the cluster and configuration differences between the first configuration of the cluster and the one or more previous configurations of the cluster.

16. The apparatus of claim 15, wherein the plurality of containers executes a distributed data processing service to process data from a storage repository comprising a distributed file system.

17. A method comprising:
- monitoring data processing efficiency information for a cluster deployed with a first configuration in a computing environment;
- determining when the data processing efficiency information meets at least one criterion to transition the cluster from the first configuration to a second configuration by determining that a first data processing efficiency score associated with the first configuration fails to satisfy a threshold efficiency value;
- when the data processing efficiency information meets the at least one criterion, identifying data processing efficiency information associated with one or more other configurations for the cluster;
- identifying one or more suggested configuration modifications for the cluster based on the data processing efficiency information associated with one or more other configurations for the cluster;
- generating for display, a notification to indicate the one or more suggested configuration modifications;
- identifying a selection of at least one modification for the cluster from the one or more suggested configuration modifications; and
- initiating implementation of the at least one modification to transition the cluster from the first configuration to the second configuration.

18. The method of claim 17, wherein the data processing efficiency information comprises a score indicative of a relationship between a data processing rate of the cluster to a physical resource allocation to the cluster.

19. The method of claim 17, wherein:
- the cluster comprises a plurality of containers; and
- the plurality of containers executes a distributed data processing service to process data from a storage repository comprising a distributed file system.

20. The method of claim 17, wherein the cluster is associated with a data processing service,
- the one or more other configurations include one or more other clusters executing the data processing service, and
- the one or more suggested configuration modifications include configuration differences between the cluster and the one or more other clusters.

* * * * *